Aug. 4, 1942.  A. FEUCHT  2,291,801
ROCK DRILL
Filed Feb. 14, 1941
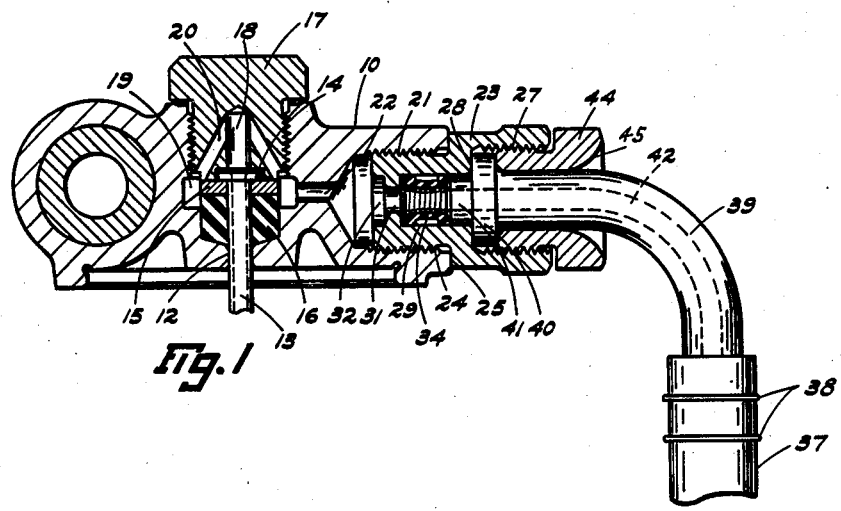
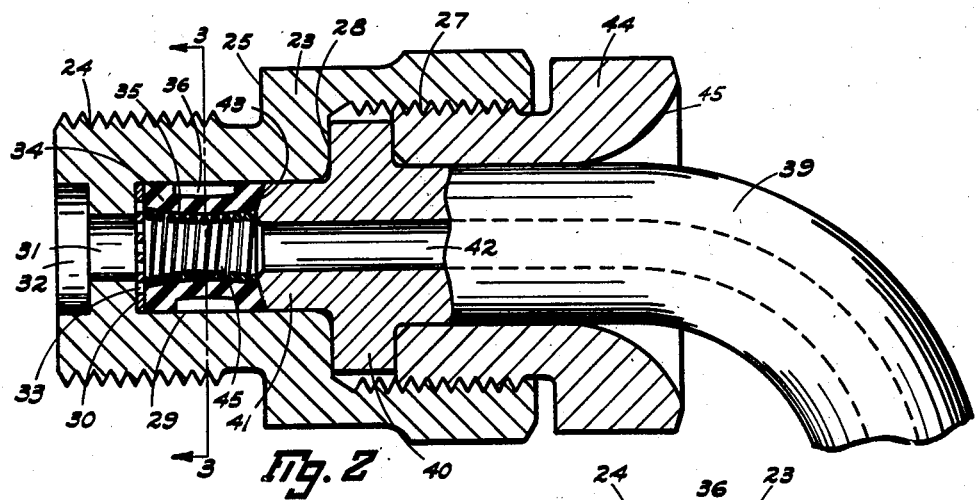
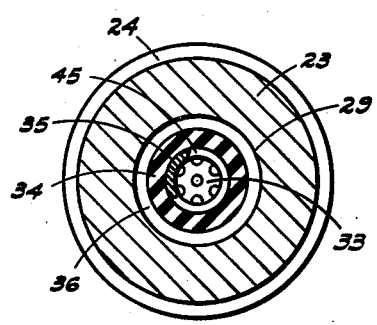
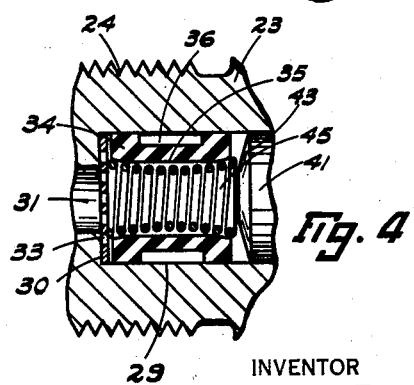
INVENTOR
ALBERT FEUCHT
BY
ATTORNEY Patented Aug. 4, 1942

2,291,801

UNITED STATES PATENT OFFICE 2,291,801

ROCK DRILL

Albert Feucht, Garfield Heights, Ohio, assignor to The Cleveland Rock Drill Company, Cleveland, Ohio, a corporation of Ohio Application February 14, 1941, Serial No. 378,908

3 Claims. (Cl. 285—97.9)

This invention relates broadly to rock drills equipped with a water tube, but more particularly to a water connection for conveying cleansing liquid to the water tube.

One object of this invention is to produce a rock drill with an improved water connection affording a fluid tight joint between the drill and the hose terminal through which cleansing liquid is supplied to the drill.

Another object of this invention is to provide a rock drill water connection with packing means arranged and disposed in a manner assuring an unobstructed flow of the water through the connection.

Other objects more or less ancillary to the foregoing reside in the specific construction and aggroupment of the elements peculiar to this structure, as will become apparent from a more complete examination of this specification.

In the drawing:

Fig. 1 represents a sectional view of a rock drill back head equipped with the improved water connection.

Fig. 2 is an enlarged sectional view of the water connection embodying the invention.

Fig. 3 is a cross sectional view taken in a plan indicated by line 3—3 in Fig. 2.

Fig. 4 is a sectional view of a portion of the connection shown in Fig. 2 illustrating some of the parts before final assembly.

Referring to the drawing, 10 represents a rock drill housing generally known as the back head which is mounted on the upper or rear end of the rock drill cylinder by any suitable means such as bolts (not shown). Centrally disposed within the housing 10 is a bore 12 through which passes a water tube 13. As is well known in this art, the tube 13 extends through the cylinder of the rock drill into the drill steel for supplying water to the bottom of the hole being drilled. This tube is formed with a head 14 resting on a washer 15 supported by a rubber packing 16, which packing forms a tight fluid joint between the upper end of the tube 13 and the housing 10. The washer 15 and packing 16 are held in position by a gland nut 17 screwed within the housing 10 and having a central bore 18 opening into the tube 13 and connected to a circular recess 19 provided in the housing 10 by two or more angular ports 20.

Referring more particularly to the invention, the housing 10 is provided with a laterally extending screw threaded bore 21 connected to the circular recess 19 through a port 22. Screwed within the bore 21, there is the shank 24 of a casing 23 which is provided with an annular shoulder 25 resting against the housing 10. Leading from the outer end of the casing, there is a relatively large screw threaded bore 27 terminated by a flat bottom 28 from which leads a smaller bore 29 also terminated by a flat bottom 30. This last bore is in communication with the bore 21 of the housing 10 through a smaller bore 31 and counterbore 32. On the bottom 30 of the bore 29 rests a perforated washer or screen 33 calculated to prevent admission of foreign matter to the water tube 13. Fitted in the bore 29 is a packing sleeve 34 made of resilient material such as rubber and having a bore 35 extending longitudinally therethrough. The packing 34 fits closely within the bore 29, while its inner diameter is somewhat greater than that necessary to supply a predetermined amount of liquid to the tube 13. In order to enable external deflection of the packing when under compression as will be hereinafter specified, it is provided intermediate its ends with an external circular recess 36.

In the present construction, liquid is supplied to the casing 23 from any suitable conduit such as a hose 37 to which is attached by means of clamps 38 a hose terminal 39, preferably bent at right angles and provided near its inner end with an external annular flange 40 engaging the flat bottom 28 of the casing bore 27. The inner end of the terminal 39 is reduced in diameter to form a cylindrical tip 41 rotatably mounted within the bore 29 behind the packing sleeve 34. Through the terminal 39 extends a liquid conveying bore or passage 42, which through the tip 41 is coaxial with the packing sleeve 34, while the end wall of the tip 41 is preferably slightly convexed as at 43 for engagement with the adjacent end of the packing sleeve 34. The length of the tip 41 is calculated to position the flange 40 in spaced relation with the bottom 28 of the bore 27 when the tip first engages the packing as shown in Fig. 4, thereby causing axial compression of the packing sleeve 34 when the flange 40 engages the bottom 28 of the bore 27, which engagement is accomplished by means of a sleeve nut 44 screwed within the bore 27 behind the flange 40. The nut has its outer end preferably flared as at 45 to enable swiveling movement of the terminal 39 which is rendered possible by slightly unscrewing the nut 44. In this instance, the convexed end 43 of the terminal 39 will still engage the packing 34 and compress it sufficiently to afford a fluid tight joint between the bore 29 and the inner end of the terminal 39.

Heretofore, it has been found that when a sleeve-like packing is subjected to axial compression, it has the tendency to deflect inwardly sufficiently to affect the liquid conveying capacity of its bore. The packing sleeve being preferably made of rubber would also be subjected to the effect of oil or other foreign matter with which it might accidentally become impregnated, resulting in undue expansion of the packing and more or less complete closure of its fluid conveying passage or bore. To overcome this objectionable occurrence, the present water connection includes an axial compressible liner in the form of a compressible spring 45 located within the bore 35 of the packing 34 and extending the full length thereof. The inner diameter of this liner is calculated to pass the full amount of liquid flowing through the passage 42 of the terminal 39. In practice, the liner 45 is preferably made of a non-flexible and non-corroding material such as stainless steel and of such physical characteristic calculated to resist inward deflection of the packing sleeve 34 while enabling its axial compression.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. In a rock drill equipped with a water tube, means for conveying water to the tube including a casing, a hose terminal in said casing, a water conveying hollow packing axially compressed between said casing and terminal to afford a water tight joint therebetween, and an axially compressible coil spring within said packing adapted to resist inward deflection of the packing.

2. In a rock drill equipped with a water tube, means for conveying water to the tube including a casing, a hose terminal in said casing, a water conveying resilient sleeve axially compressible between said casing and terminal to afford a water tight joint therebetween, means to retain said terminal in said casing and to compress said sleeve, and an axially compressible liner in said sleeve adapted to resist inward deflection of the sleeve.

3. In a device of the class described, a casing, a hose terminal in said casing, a liquid conveying resilient sleeve axially compressed between said casing and terminal to afford a fluid tight joint therebetween, and an axially compressible liner in said sleeve adapted to resist inward deflection of the sleeve.

ALBERT FEUCHT.